(12) United States Patent  (10) Patent No.: US 7,535,673 B2
Burns et al.  (45) Date of Patent: *May 19, 2009

(54) FLUID DYNAMIC BEARING COMPRISING A LUBRICATING FLUID HAVING TOLUTRIAZOLE

(75) Inventors: John M. Burns, San Jose, CA (US); Malika D. Carter, San Jose, CA (US); Thomas E. Karis, Aromas, CA (US); Kunihiro Shida, San Jose, CA (US); Stanley Y. Wong, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 382 days.

This patent is subject to a terminal disclaimer.

(21) Appl. No.: 11/338,093

(22) Filed: Jan. 23, 2006

(65) Prior Publication Data

US 2007/0171569 A1  Jul. 26, 2007

(51) Int. Cl.
  *G11B 17/02* (2006.01)
(52) U.S. Cl. .................................. 360/99.08
(58) Field of Classification Search ............... 360/99.08
  See application file for complete search history.

(56) References Cited

U.S. PATENT DOCUMENTS

| | | | |
|---|---|---|---|
| 4,606,890 A * | 8/1986 | Fisk | 422/15 |
| 5,308,521 A | 5/1994 | Pavilon et al. | |
| 5,498,352 A | 3/1996 | Graham et al. | |
| 5,538,653 A | 7/1996 | Avery et al. | |
| 5,627,147 A | 5/1997 | Hayakawa et al. | |
| 5,629,274 A | 5/1997 | Hayakawa et al. | |
| 5,736,493 A * | 4/1998 | Garmier | 508/491 |
| 5,789,836 A | 8/1998 | Hayakawa | |
| 5,930,075 A * | 7/1999 | Khan et al. | 360/99.08 |
| 6,100,406 A | 8/2000 | Camenzind et al. | |
| 6,643,093 B2 | 11/2003 | Brown et al. | |
| 6,758,597 B2 | 7/2004 | Narita et al. | |
| 6,903,056 B2 | 6/2005 | Nagano et al. | |
| 2003/0134753 A1 * | 7/2003 | Stunkel et al. | 508/281 |
| 2004/0116306 A1 | 6/2004 | Wenderoth et al. | |
| 2005/0068667 A1 | 3/2005 | Burns et al. | |
| 2008/0026965 A1 * | 1/2008 | Karis et al. | 508/363 |

* cited by examiner

*Primary Examiner*—A. J. Heinz (57) ABSTRACT

A system and method for reducing corrosion in a fluid dynamic bearing is disclosed. In one embodiment, a fluid dynamic bearing comprising a rotor portion and a stator portion is formed. In addition, a corrosion inhibitor containing lubricating fluid is provided between the rotor portion and the stator portion of the fluid dynamic bearing, wherein the corrosion inhibitor containing lubricating fluid does not react with either the rotor portion or the stator portion of the fluid dynamic bearing.

20 Claims, 6 Drawing Sheets

FLUID DYNAMIC BEARING COMPRISING A LUBRICATING FLUID HAVING TOLUTRIAZOLE

TECHNICAL FIELD

This invention relates generally to the field of direct access storage devices and in particular to resolving the issue of metals used in a fluid dynamic bearing reacting adversely with the lubricating fluid.

BACKGROUND ART

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

Market demand for more performance from the HDD has led to advances in motor-hub assembly technology. Of particular interest is the introduction of fluid dynamic bearings (FDB). By using an FDB in an HDD, a disk can be spun at faster speeds with less unwanted vibrations traditionally experienced with ball bearings. Since there is minimal contact between moving parts, an FDB will not wear as quickly as a traditional ball bearing.

A fluid dynamic bearing is the result of a thin layer of fluid, such as oil, moving between two juxtaposed surfaces and thus creating a barrier between the two surfaces that prevents their contact. Methods have been varied for moving the fluid to generate the FDB. One early method of moving the fluid was to use a pump that was external to the juxtaposed surfaces. This is costly for HDD application. The more widely used method for moving the fluid is to create a pattern of grooves on the juxtaposed surfaces that create internal pressure on the fluid when such surfaces are moved with respect to each other. To accommodate the occasional contact of the two juxtaposed surfaces, they may be given a protective coating that is resistant to wear. With recent advances in FDB design, wear of the juxtaposed surfaces has been minimized, and the wear resistant coating can now be eliminated.

Normally, the materials used to fabricate the two juxtaposed surfaces in an FDB are chosen for their ease of machinability while meeting the physical requirements of an FDB. The preferred material is categorized as yellow metal. Yellow metal is any metal that contains copper as its major element.

One deleterious effect of operating an FDB with exposed yellow metal surfaces is that the fluid in the FDB reacts with the yellow metal. For example, the thin layer of moving fluid can corrode the yellow metal causing the performance of the FDB to deteriorate at an unsatisfactory rate. One solution to the problem is to reintroduce a wear resistant coating such as a thin layer of nickel-phosphorous to the yellow metal. The application process typically used to apply nickel-phosphorous is an electro-plating process, which is widely known and understood in the industry.

However, the electro-plating process and additional manufacturing steps have associated costs that increase the overall cost of the FDB.

SUMMARY OF THE INVENTION

A system and method for reducing corrosion in a fluid dynamic bearing are described herein. In one embodiment, a fluid dynamic bearing comprising a rotor portion and a stator portion is formed. In addition, a corrosion inhibitor containing lubricating fluid is provided between the rotor portion and the stator portion of the fluid dynamic bearing, wherein the corrosion inhibitor containing lubricating fluid does not react with either the rotor portion or the stator portion of the fluid dynamic bearing.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected therewith. The discussion will then focus on embodiments of a system and method for reducing corrosion in a fluid dynamic bearing (FDB). Although the FDB is shown in a hard disk drive (HDD), it is understood that the embodiments described herein are useful in an FDB regardless of whether or not the FDB is a portion of the HDD. The utilization of the FDB within the HDD is only one embodiment and is provided herein merely for purposes of brevity and clarity.

Overview

Figure 1A:
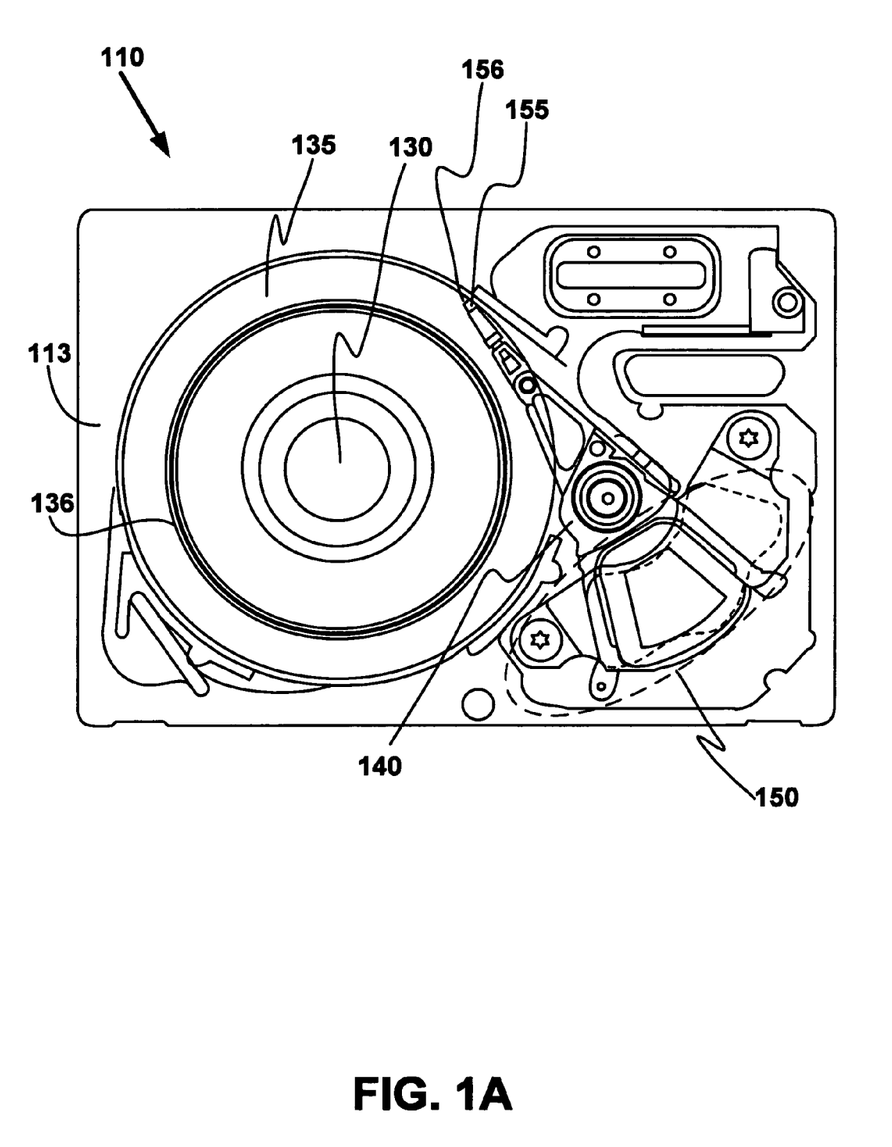
FIG. 1A is a plan view of an HDD with cover and top magnet removed in accordance with one embodiment of the present invention.

With reference now to FIG. 1A, a plan view of an HDD with cover and top magnet removed is shown in accordance with one embodiment of the present invention. FIG. 1A illustrates the relationship of components and sub-assemblies of HDD 110 and a representation of data tracks 136 recorded on the disk surface 135. The cover is removed and not shown so that the inside of HDD 110 is visible. The components are assembled into base casting 113, which provides attachment and registration points for components and sub-assemblies.

Data is recorded onto disk surface 135 in a pattern of concentric rings known as data tracks 136. Disk surface 135 is spun at high speed by means of a motor-hub assembly 130. Data tracks 136 are recorded onto disk surface 135 by means of magnetic head 156, which typically resides at the end of slider 155. FIG. 1A being a plan view shows only one head and one disk surface combination. One skilled in the art understands that what is described for one head-disk combination applies to multiple head-disk combinations such as the isometric blow-apart of an HDD shown in FIG. 1B. However, for purposes of brevity and clarity, FIG. 1A only shows one head and one disk surface.

The dynamic performance of HDD 110 is a major mechanical factor for achieving higher data capacity as well as for manipulating this data faster. The quantity of data tracks 136 recorded on disk surface 135 is determined partly by how well magnetic head 156 and a desired data track 136 can be positioned to each other and made to follow each other in a stable and controlled manner.

There are many factors that will influence the ability of HDD 110 to perform the function of positioning magnetic head 156, and following data track 136 with magnetic head 156. In general, these factors can be put into two categories; those factors that influence the motion of magnetic head 156; and those factors that influence the motion of data track 136. Undesirable motions can come about through unwanted vibration and undesirable tolerances of components. Herein, attention is given to motor-hub assembly 130, which attaches to base casting 113, and in particular, attention is given to the fluid dynamic bearing inside motor-hub assembly 130.

Physical Description

Figure 1B:
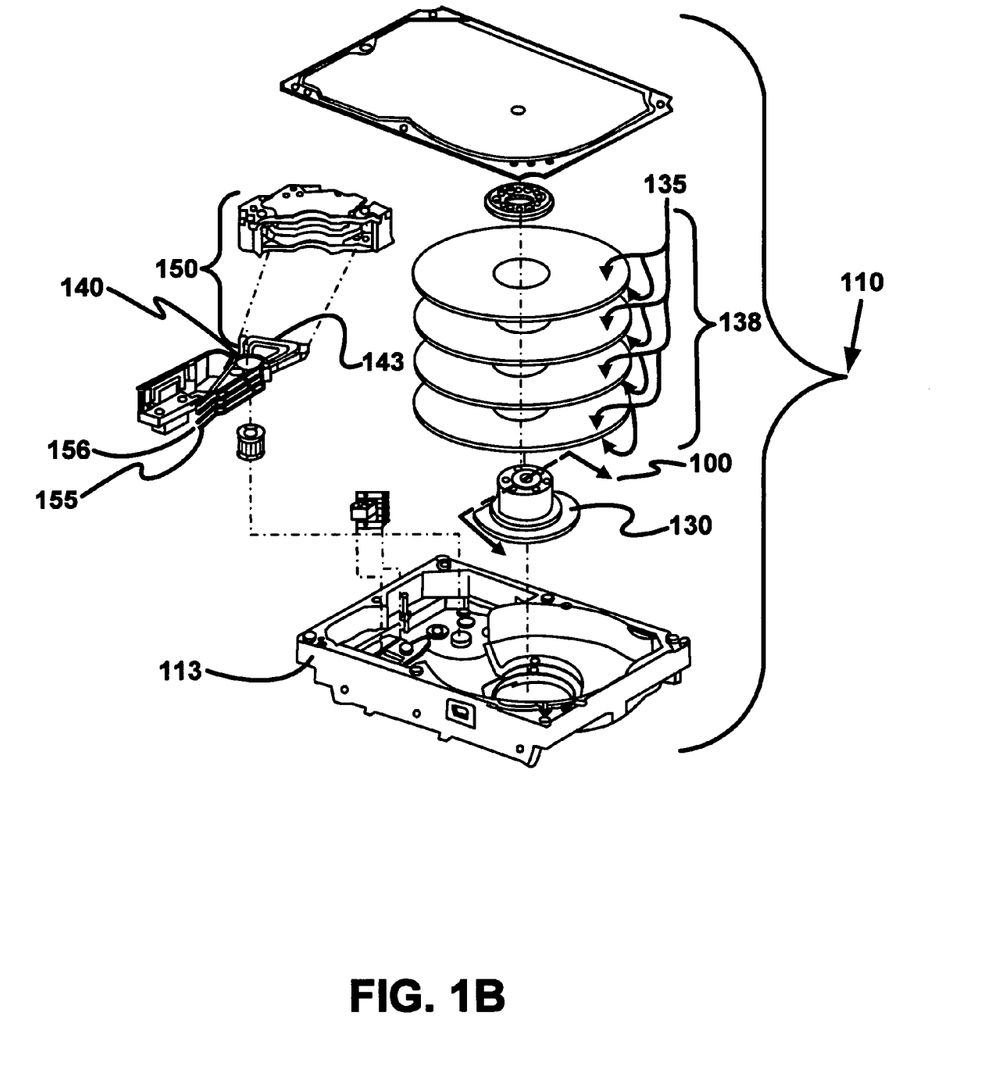
FIG. 1B is an isometric blow-apart of an HDD in accordance with one embodiment of the present invention.
Figure 2:
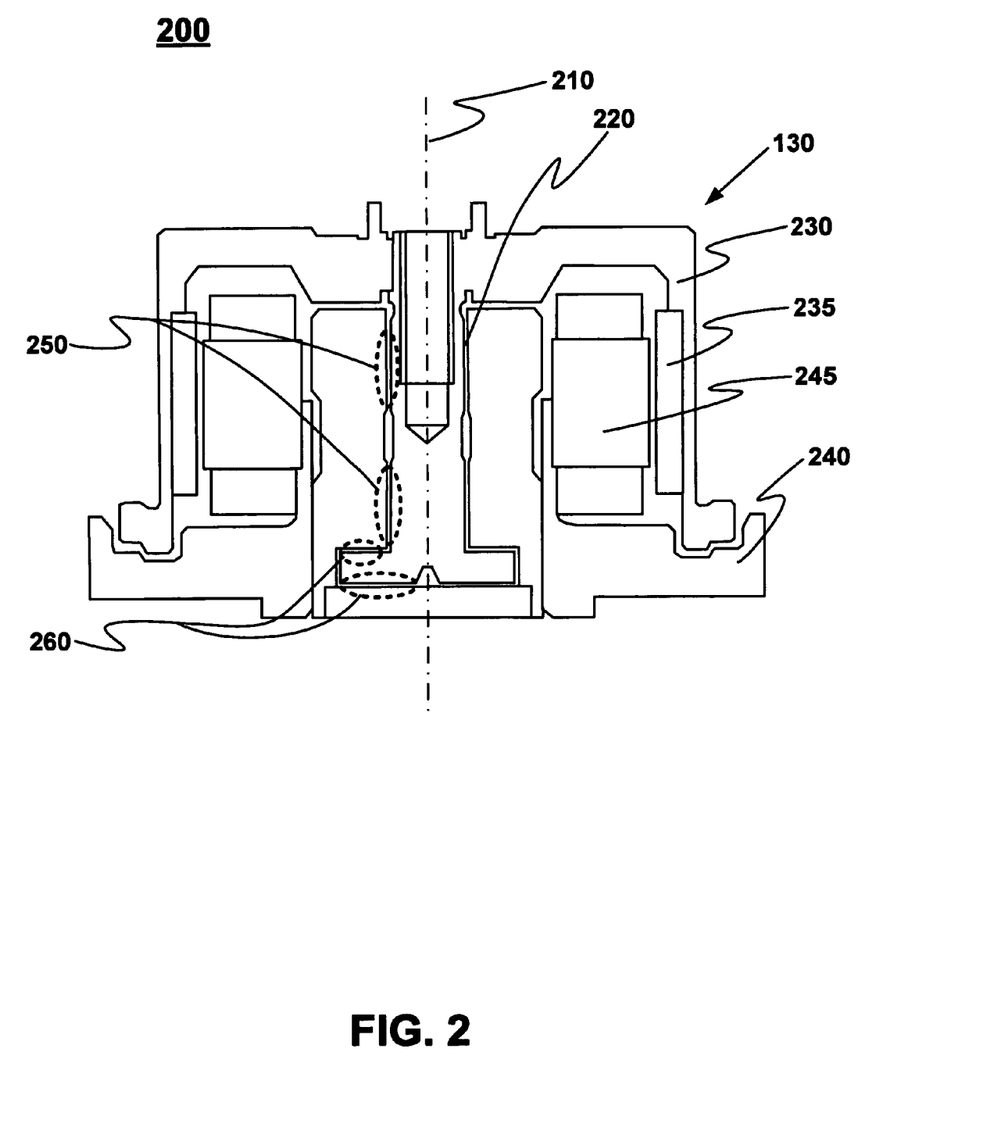
FIG. 2 is a cross-section view of motor-hub assembly in accordance with one embodiment of the present invention.

With reference now to FIG. 2 and to FIG. 1B, a cross-section view 200 of motor-hub assembly 130 is shown in accordance with one embodiment of the present invention. In general, motor-hub assembly 130 supports disk stack 138 so that disk surface 135 can be spun adjacent to slider 155 and thus allow magnetic head 156 to read and write data tracks 136 on disk surface 135. A cross-section view 200 in FIG. 2, taken along section line 100 (FIG. 1B) reveals the inside structure of motor-hub assembly 130 and the FDB. For clarity, only half of cross-section view 200 is crosshatched. Several components are joined together to form rotor 230 and stator 240. Motor magnet 235, which is coupled to rotor 230 and motor winding 245, which is coupled to stator 240 are not crosshatched for clarity, are considered to be parts of rotor 230 and stator 240. Gap 220 between rotor 230 and stator 240 is also not crosshatched. Generally, features shown in cross-section 200 are circular and symmetric about axis 210. Therefore, a feature shown or highlighted in cross-section 200 on one side of axis 210 is normally the same feature found on the other side of axis 210.

Referring to FIG. 2, axis 210 is an axis of symmetry as well as the axis of rotation for motor-hub assembly 130 and disk pack 138. Since rotor 230 and stator 240 are the major structural components of motor-hub assembly 130, rotor 230 and stator 240 also share the same axes of symmetry and are coincident with axis 210. Rotor 230 is retained by its geometry to rotate about stator 240.

Gap 220 is comprised of the outer surface of rotor 230 and the inner surface of stator 240. Four zones of gap 220 are highlighted in FIG. 2. Two zones are denoted as zones 250, and two zones are denoted as zones 260. Zones 250 produce radial stiffness for the FDB. Zones 260 produce axial stiffness for the FDB. Each surface is patterned in such a manner as to be conducive to supporting a film of fluid and to impart movement to this fluid, which is placed in gap 220. The moving fluid produces a film that is resistant to collapsing and hence prevents juxtaposed surfaces from coming in contact. This film couples rotor 230 to stator 240 such that rotor 230 maintains a constant separation (gap 220) from stator 240 while allowing rotor 230 to rotate freely.

Figure 3:
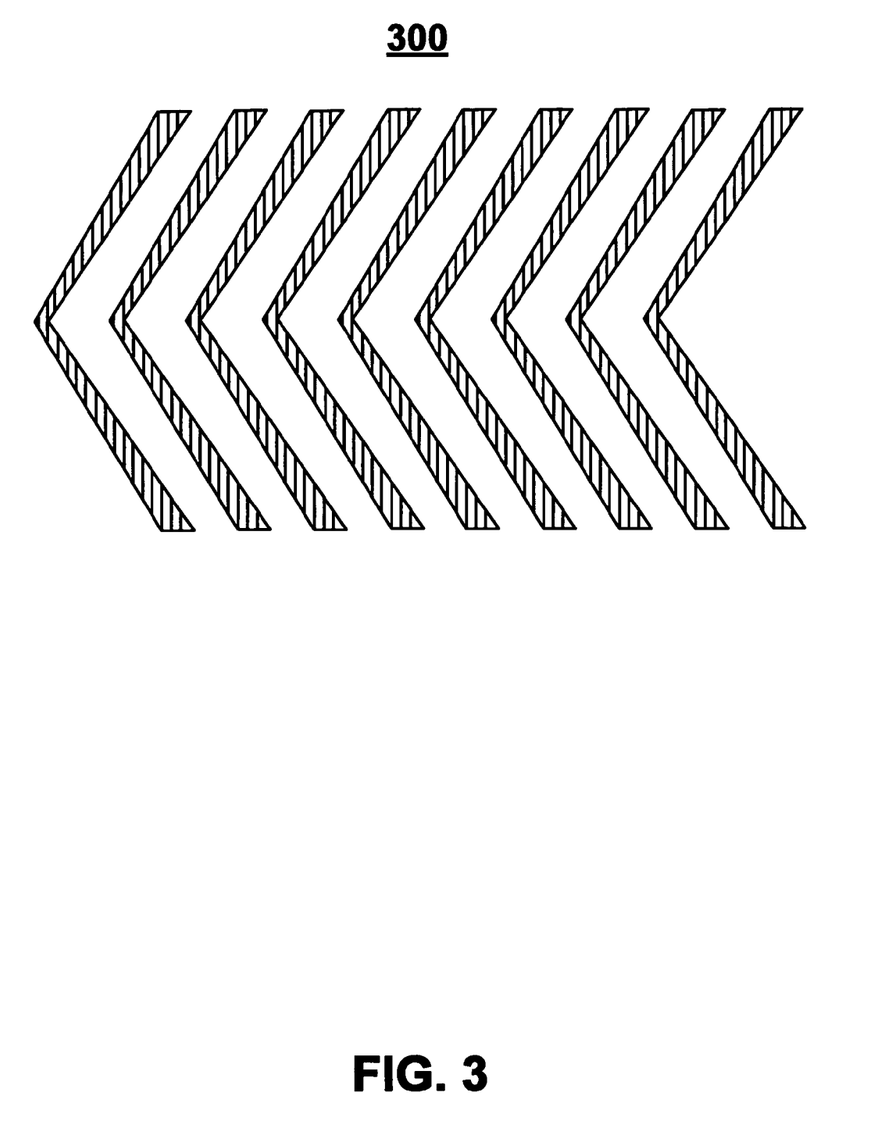
FIG. 3 is an exemplary herringbone groove pattern in accordance with one embodiment of the present invention.

With reference now to FIG. 3, a herringbone pattern fabricated into a surface in gap 220 is shown in accordance with an embodiment of the present invention. In general, herringbone pattern 300 is a series of grooves that are fabricated into a surface in gap 220 at zones 250. Typically herringbone pattern 300 is fabricated onto the outer surface of rotor 230 in zones 250, and the juxtaposed surface of stator 240 is a polished surface. However, embodiments described herein are not dependent upon which surface contains herringbone pattern 300 or whether both surfaces contain herringbone pattern 300.

Figure 4:
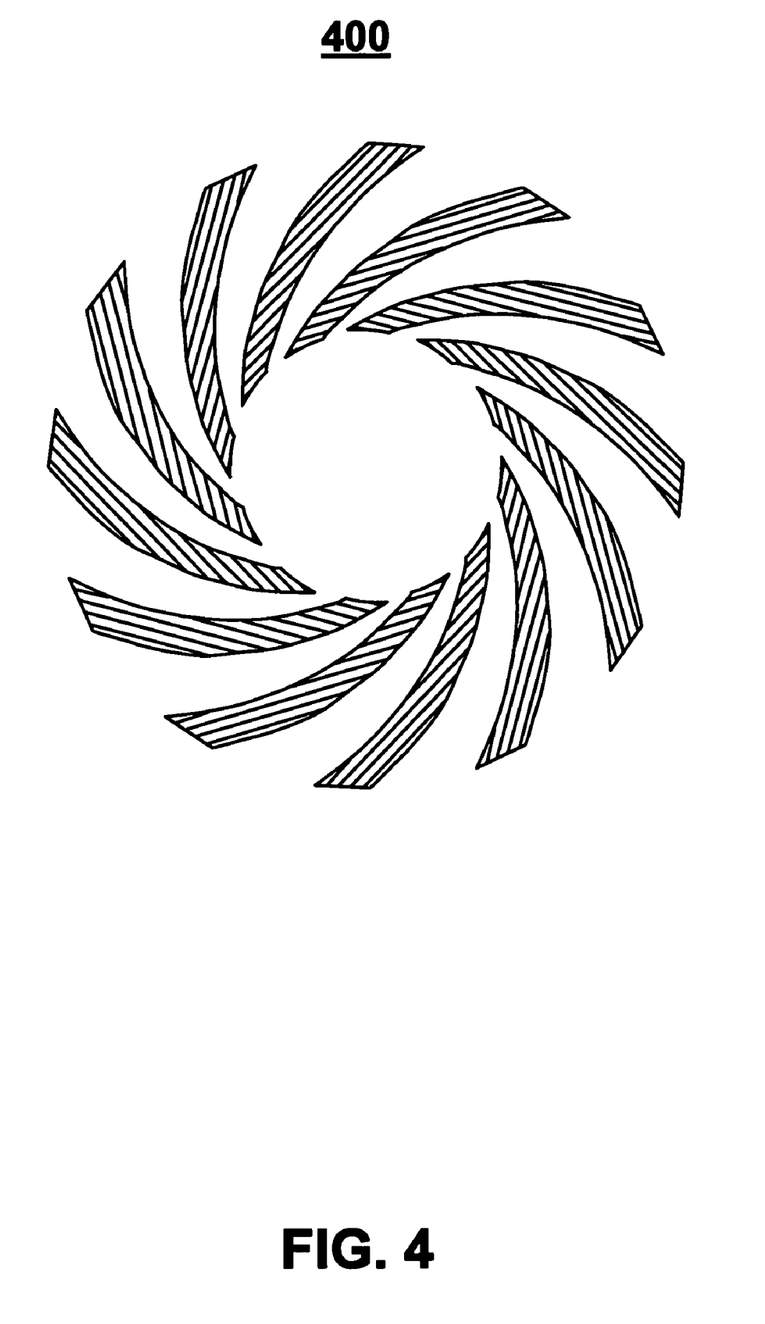
FIG. 4 is an exemplary spiral groove pattern in accordance with one embodiment of the present invention.

Referring now to FIG. 4, a spiral pattern fabricated into a surface in gap 220 is shown in accordance with an embodiment of the present invention. In general, spiral pattern 400 is a series of grooves fabricated into a surface in gap 220 at zones 260. In one embodiment, spiral pattern 400 is provided on the surface of rotor 230. In another embodiment, spiral pattern 400 is provided on the surface of stator 240 in zones 250. In yet another embodiment, spiral pattern 400 is provided on both the surface of rotor 230 and the surface of stator 240 in zones 250. One juxtaposed surface in zone 260 is typically a polished surface. However, embodiments described herein are not dependent upon which surface contains spiral pattern 400 or a polished surface.

Operation

It should be appreciated from FIGS. 2, 3, and 4 that rotor 230 and stator 240 require skill and clever technology to fabricate. The metal chosen to fabricate the components that comprise rotor 230 and stator 240 are chosen for their ease of machinability; their adaptability to fabrication technologies; and suitability for application in an FDB. A metal of choice has been bronze. Brass is also another metal of choice for fabricating the intricate herringbone pattern 300 and spiral pattern 400. These metals are sometimes categorized as yellow metals because of their yellow color. However, any metal that contains copper as its major element is classified as yellow metal.

The moving fluid that comprises the fluid dynamic bearing is also a lubricating fluid or oil. The lubricating properties of the moving fluid are required for the occasion of contact between the juxtaposed surfaces of rotor 230 and stator 240. Contact occurs primarily upon start and stop of rotation of motor-hub assembly 130. For example, at the operating condition of starting, the fluid in gap 220 is not moving and has not established the FDB. Additionally, at the operating condition of stopping, the moving fluid in gap 220 ceases to move and the FDB is no longer established.

Generally, the lubricating properties of the moving fluid, such as viscosity and conductivity, should not change throughout the life of motor-hub assembly 130. (The moving fluid, which is also a lubricating fluid, will be referred to herein as oil for purposes of brevity and clarity.) In one embodiment, the oil is organic oil containing atoms of carbon, hydrogen and oxygen.

However, since oil is a hydrocarbon, almost universally a hydrocarbon ester, it is subject to thermal oxidation. In general, oxidation starts when a carbon radical is generated through proton (hydrogen atom) abstraction from the oil molecule. This is a thermally activated process, so the rate increases exponentially with temperature. The carbon radical will then combine with oxygen to form peroxide and hydroperoxide, which normally decompose through a finite transition state into at least two radicals. The at least two radicals eventually recombine, or lead to polar products such as alcohols and acids on the original oil molecule. The polar groups associate oil molecules together by hydrogen bonding, thus increasing the oil viscosity.

In an effort to prevent increasing oil viscosity, antioxidants are added to the oil to intercept the carbon radicals. However, each radical that is quenched consumes a finite increment of antioxidant. Moreover, not all radicals are quenched before the oxidation chain has a chance to propagate to form hydroxyl and carboxylic acid groups on some of the oil molecules. Detrimentally, the carboxylic acid corrodes the juxtaposed surfaces of the FDB.

Additionally, iron and copper in the FDB catalyze decomposition of hydroperoxide. The effect of this catalysis is that the antioxidant is depleted from the oil. For example, the dissolved metal ions remain in the oil shuttling between oxidation states during the catalysis while continually depleting the antioxidant. Thus, once the antioxidant is consumed through catalysis it will no longer be available to prevent the increasing of the oil viscosity. Then, the FDB will either fail through corrosion of the juxtaposed surfaces of the FDB or through oil viscosity change.

In addition to the described mechanical deterioration of the FDB, the dissolved metal ions in the oil also change the conductivity of the FDB. That is, the oil film created in the FDB is utilized as part of the electrical grounding path for dissipating the static electric charge generated by slider 155 flying over disk surface 135. Although there are additives to the oil to provide the oil with a desired electrical conductivity, the dissolved metal ions entering the oil defeat these additives. As the additives are defeated, increases in the conductivity and ionic content of the oil will cause increases in the conductivity of the electrical grounding path Thus, mitigating the catalytic effect is critical for allowing the FDB to have a useful life at a reasonable cost and assuring the reliability of HDD 110. One approach, known in the industry, uses a complexing agent that precipitates the metal ions as sludge. However, this complexing agent approach cannot be used in the delicate FDB, which has an oil film thickness of 8 to 10 microns.

Another approach is to passivate the metal surfaces. A metal passivator is a corrosion inhibitor that reacts with the metal surface to form a microscopic hard oxide layer that makes it resistant to further oxidation and corrosion. Ferrous metal passivation is typically a process performed after fabrication of the ferrous metal part and prior to the part being used. There are various well-known methods for passivating ferrous metals; for example aryl phosphates and calcium phosphates. However, a different class of compounds is required for passivating yellow metals.

However, the use of a yellow metal passivator in a FDB has not been previously required due to the wear-resistant coating, such as the thin layer of nickel-phosphorous, added to the yellow metal of the rotor and stator. In other words, due to the wear-resistant nickel-phosphorous coating, no yellow metal corrosion occurs. However, in reducing manufacturing a cost, the layer of nickel-phosphorous has been removed, resulting in a previously nonexistent problem of yellow metal corrosion. Thus, having no need for passivators before in an FDB, various formulations for passivating yellow metals were tested as additives for use in an FDB.

Generally, passivation of yellow metals is performed by adding a passivator to the oil. Most yellow metal passivators for use in oil are derived from triazole. A classic triazole, i.e. benzotriazole, bonds to copper through lone pair orbitals on the nitrogen ring. Adjacent benzotriazole molecules link together by hydrogen bonding to form a corrosion inhibiting layer that makes the yellow metal resistant to further oxidation and corrosion.

Therefore, a series of thermal stability tests evaluated several formulations of corrosion inhibitors for use in an FDB. These tests were performed on bulk samples of oil formulations and not in an FDB. One test measured the oxidation rate of an oil formulation in the presence of copper (the main element of yellow metal). This test is known as an RBOT (Rotary Bomb Oxidation Stability Test). Another test measured the combustion temperature of an oil formulation. This test is known as a NIPDSC test (Non-Isothermal Pressurized Differential Scanning Calorimetry). One schooled in the art will understand the parameters and operation of these tests. For brevity, the details of these tests will not be discussed. However, these tests produced important information and guidance towards a preferred formulation of oil. Testing of the preferred formulation in operating motor-hub assemblies also provided a dramatic comparison of the improvement gained from the preferred formulation of oil.

Table 1 below presents the FDB lubricating formulations that were tested in operation.

TABLE 1

FDB LUBRICATING FORMULATIONS

| Sample Oil Label | Conductivity Controller (wt %) | 5MeBTA (wt %) | Vanlube 9317 (wt %) |
|---|---|---|---|
| NPG base oil | 0 | 0 | 0 |
| S | X | 0 | 0 |
| V2 | 0 | 0 | 2 |
| V05 | 0 | 0 | 0.5 |
| V05CI | 0 | 0.05 | 0.5 |

Referring to Table 1, NPG base oil is the as-received oil formulation used in an FDB. The amounts of additives specified were added to NPG base oil to make the other oil samples in Table 1. Vanlube 9317, also an antioxidant, is effective at high temperature conditions such as sustained running of HDD 110. Vanlube 9317 also functions to control the conductivity of the FDB oil. Conductivity Controller is an additive that controls the conductivity of the FDB oil. 5MeBTA or more exactly 5-Methyl-1H-benzotriazole, also known as tolutriazole, is a more pure form tolutriazole (TTA).

In one embodiment, TTA is introduced to the yellow metal directly as an additive. However, TTA can also be introduced to the yellow metal as part of a compound that releases TTA throughout the life of the oil. Examples of TTA releasing compounds are N,N-bis(2-Ethylhexyl)-ar-methyl-1H-benzotriazole-1-methanamine and N,N-bis(2-Ethylhexyl)-4-methyl-1H-benzotriazole-methylamine. In general, TTA releasing compounds can be formulated to have specific characteristics groomed to meet specific needs such as vapor pressure or volatility, which are important for affecting outgassing in an HDD environment.

Referring to Table 1, formulations NPG base oil, S, V2, and V05 all experienced failures when subjected to accelerated life test conditions. Formulation V05CI did not have any failures under accelerated life conditions. The test conditions were made more severe and testing of formulation V05CI was restarted. After 17,000 hours of testing under severe conditions, there were no failures.

Some of the subtleties of oil formulation V05CI were realized in the thermal stability tests and confirmed in the accelerated life test. For example, early thermal stability tests indicated that the corrosion inhibitor, tolutriazole, preserved the high and low temperature antioxidants, Phenol and Vanlube 9317. However, it is important not to have too much tolutriazole in the oil formulation. That is, excess tolutriazole could outgas when subjected to HDD operating temperatures and contaminate the HDD environment, potentially causing HDD failure.

The thermal stability test showed that as much as 0.25% of tolutriazole can be effective in controlling the oxidation of FDB oil. However, 0.05% is equally effective and well below the concentration at which out-gassing is a concern. With the preservation of the antioxidants by the addition of 0.05% of tolutriazole, it was also realized that Conductivity Controller could be eliminated from the formulation. In other words, the conductivity control built into the Vanlube 9317 is preserved by the tolutriazole and is sufficient by itself to control the conductivity of the oil.

Figure 5:
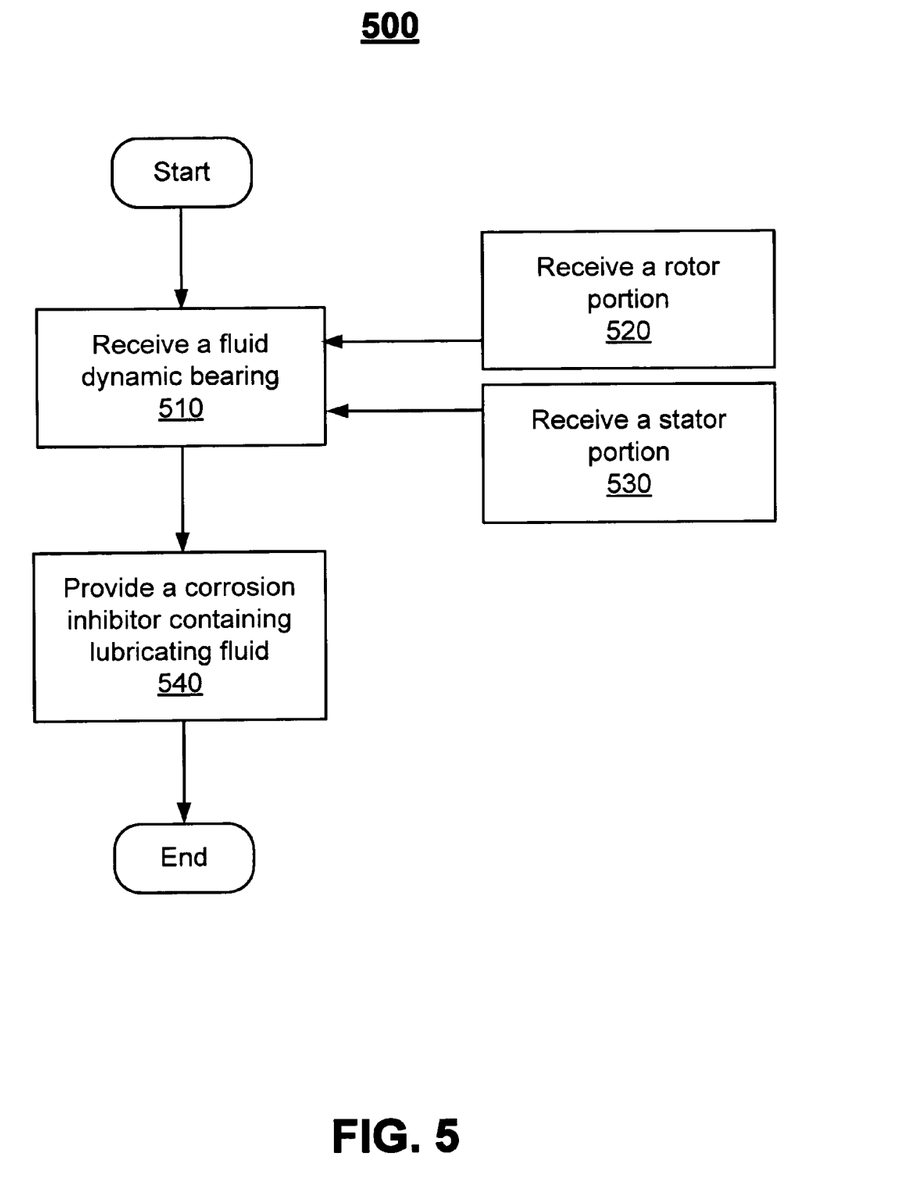
FIG. 5 is a flow chart illustrating the steps of a method for reducing corrosion in a fluid dynamic bearing in accordance with one embodiment of the present invention.

With reference now to FIG. 5, a flow chart 500 of a method for reducing corrosion in a fluid dynamic bearing is shown in accordance with one embodiment of the present invention. In general, flowchart 500 includes processes that may be carried out by processors, electrical components and assembly mechanisms under the control of computer readable and computer executable instructions. The computer readable and computer executable instructions reside, for example, in data storage features such as a computer usable volatile memory and/or a computer usable non-volatile memory and/or a data storage device. However, the computer readable and computer executable instructions may reside in any type of computer readable medium.

Although specific processes are disclosed in flowchart 500, such processes are exemplary. That is, the present invention is well suited to performing various other processes or variations of the processes recited in FIG. 5. Within the present embodiment, it should be appreciated that the processes of flowchart 500 may be performed by software, by hardware, by an assembly mechanism, through human interaction, or by any combination of software, hardware, assembly mechanism, and human interaction.

Referring now to 510 of flowchart 500 and to FIG. 2, in one embodiment, a fluid dynamic bearing 200 is received. In 520, a rotor portion 230 is received and introduced to the fluid dynamic bearing 200. Furthermore, in 530, a stator portion 240 is received and introduced to the fluid dynamic bearing 200. In one embodiment, at least a portion of the rotor 230 is formed from a yellow metal. In another embodiment, at least a portion of the stator 240 is formed from a yellow metal. In yet another embodiment, at least a portion of the rotor 230 and at least a portion of the stator 240 are formed from a yellow metal. In one embodiment, the yellow metal is bronze. In another embodiment, the yellow metal is brass.

With reference now to 540 of flowchart 500, in one embodiment, a corrosion inhibitor containing fluid is provided in gap 220 of the fluid dynamic bearing 200. In one embodiment, organic oil is utilized as the corrosion inhibitor containing lubricating fluid. In another embodiment, a tolutriazole is used as the corrosion inhibitor containing lubricating fluid.

Thus, embodiments described herein solve the unanticipated problem of the fluid in the FDB attacking the metal used in fabricating rotor 230 and stator 240. Advantageously, the present invention, in the various embodiments further provides reliability and longevity of an FDB while allowing the cost reduction measure of removing the wear resistant coating. Reliability and longevity are obtained by preventing the occurrence of metal ions in the FDB oil by passivating yellow metal that is exposed to contact with the FDB oil.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for reducing corrosion in a fluid dynamic bearing comprising:
   receiving a fluid dynamic bearing comprising:
      receiving a rotor portion; and
      receiving a stator portion; and
   providing a corrosion inhibitor containing lubricating fluid between said rotor portion and said stator portion, wherein said corrosion inhibitor containing lubricating fluid comprises tolutriazole.

2. The method of claim 1 further comprising:
   utilizing an organic oil in said corrosion inhibitor containing lubricating fluid.

3. The method of claim 1 further comprising:
   providing said tolutriazole in an approximate range of 0.05%-0.25% in said corrosion inhibitor containing lubricating fluid.

4. The fluid dynamic bearing of claim 1 further comprising:
   forming at least a portion of said rotor portion and at least a portion of said stator portion from a yellow metal.

5. The fluid dynamic bearing of claim 4 further comprising:
   utilizing bronze as said yellow metal.

6. The fluid dynamic bearing of claim 4 further comprising:
   utilizing brass as said yellow metal.

7. A fluid dynamic bearing comprising:
   a corrosion inhibitor containing lubricating fluid;
   a rotor having;
      an axis of rotation; and
      a surface conducive to supporting a film of said corrosion inhibitor containing lubricating fluid; and
   a stator having;
      an axis coincident to said axis of rotation; and
      a complimentary surface juxtaposed to said rotor which is conducive to supporting said corrosion inhibitor containing lubricating fluid such that said rotor is rotatably retained;
   wherein said corrosion inhibitor containing lubricating fluid comprises tolutriazole.

8. The fluid dynamic bearing of claim 7 wherein said corrosion inhibitor containing lubricating fluid comprises an organic oil.

9. The fluid dynamic bearing of claim 7 wherein said corrosion inhibitor containing lubricating fluid comprises said tolutriazole in an approximate range of 0.05%-0.25%.

10. The fluid dynamic bearing of claim 7 wherein at least a portion of said surface of said rotor and at least a portion of said surface of said stator is comprised of a yellow metal.

11. The fluid dynamic bearing of claim 10 wherein said yellow metal is bronze.

12. The fluid dynamic bearing of claim 10 wherein said yellow metal is brass.

13. A disk drive system comprising:
a rotatably mounted magnetic disk;
a rotor coupled to said magnetic disk;
a stator for rotatably retaining said rotor;
a motor coupled to said rotor for rotating said magnetic disk via said rotor;
a fluid dynamic bearing that couples said stator to said rotor; and
a corrosion inhibitor containing lubricating fluid utilized in said fluid dynamic bearing, wherein said corrosion inhibitor containing lubricating fluid comprises tolutriazole, thereby reducing corrosion of a yellow metal of said fluid dynamic bearing.

14. The fluid dynamic bearing of claim 13 wherein said corrosion inhibitor containing lubricating fluid comprises an organic oil.

15. The fluid dynamic bearing of claim 13 wherein said corrosion inhibitor containing lubricating fluid comprises said tolutriazole in an approximate range of 0.05%-0.25%.

16. The fluid dynamic bearing of claim 13 wherein said surface of said rotor is comprised of a yellow metal.

17. The fluid dynamic bearing of claim 13 wherein said surface of said stator is comprised of a yellow metal.

18. The fluid dynamic bearing of claim 17 wherein said yellow metal is bronze.

19. The fluid dynamic bearing of claim 17 wherein said yellow metal is brass.

20. A fluid dynamic bearing having reduced corrosion properties, said fluid dynamic bearing comprising:
stator means;
rotor means; and
corrosion inhibitor containing lubricating fluid means disposed between said rotor means and said stator means of said fluid dynamic bearing, wherein said corrosion inhibitor containing lubricating fluid means comprises tolutriazole.

* * * * *